United States Patent [19]

Eckels

[11] 4,056,745
[45] Nov. 1, 1977

[54] CRYOGEN TRANSFER COUPLING WITH ADJUSTABLE THROTTLE VALVE FOR ROTATING MACHINERY

[75] Inventor: Phillip W. Eckels, Pittsburgh, Pa.

[73] Assignee: Westinghouse Electric Corporation, Pittsburgh, Pa.

[21] Appl. No.: 647,462

[22] Filed: Jan. 8, 1976

[51] Int. Cl.² ............................................. H02K 9/00
[52] U.S. Cl. ....................................... 310/52; 62/505; 62/514 JT
[58] Field of Search ...................... 310/52, 54, 40, 10, 310/53, 55, 61, 64; 62/505, 514 JT

[56] References Cited

U.S. PATENT DOCUMENTS

| | | | |
|---|---|---|---|
| 3,257,823 | 6/1966 | Hogan | 62/514 JT |
| 3,413,819 | 12/1968 | Hansen | 62/514 JT |
| 3,413,821 | 12/1968 | Villaume | 62/514 JT |
| 3,645,112 | 2/1972 | Nicholds | 62/514 JT |
| 3,679,920 | 7/1972 | MacNab | 310/10 |
| 3,743,867 | 7/1973 | Smith | 310/52 |
| 3,764,835 | 10/1973 | Luck | 310/10 |
| 3,845,639 | 11/1974 | Smith | 62/505 |

FOREIGN PATENT DOCUMENTS

| | | | |
|---|---|---|---|
| 2,326,016 | 5/1973 | Germany | 310/52 |
| 2,325,707 | 5/1973 | Germany | 310/52 |

Primary Examiner—R. Skudy
Attorney, Agent, or Firm—G. H. Telfer

[57] ABSTRACT

A relatively rotatable coupling apparatus is disclosed for conveying fluid from a stationary reservoir to a rotatable member. An adjustable throttle valve is operably connected intermediate of the coupling apparatus and the rotatable member for controlling the flow of fluid from the reservoir to the rotatable member. The relatively rotatable coupling apparatus has a first conduit portion connected to the reservoir defining an inlet flow path and a second conduit portion connected to the rotatable member defining a discharge flow path for the fluid. The first and second conduit portions are interconnected in an overlapping radially spaced apart relation by rotatable interconnecting means to define a relative motion gap between the overlapping portions and to permit rotational movement of the second conduit portion relative to the first conduit portion. The throttle valve has a valve seat disposed in the discharge flow path of the second conduit portion and a valve plug disposed intermediate of the valve seat and the rotatable member. Provisions are made for axially displacing the valve plug relative to the valve seat to provide adjustable throttling of the flow of fluid from the reservoir to the rotatable member.

2 Claims, 3 Drawing Figures

CRYOGEN TRANSFER COUPLING WITH ADJUSTABLE THROTTLE VALVE FOR ROTATING MACHINERY

The invention herein described was made in the course of or under a contract, or under a contract or subcontract thereunder, (or grant), with the Department of Defense.

BACKGROUND OF THE INVENTION

1. Field of the Invention

The present invention relates to apparatus for transferring fluid from a stationary reservoir to a rotatable member, and more particularly to means for conveying, controlling the flow, and varying the evaporating pressure and temperature of a cooling fluid from a reservoir to the rotor member of a dynamoelectric machine.

2. Description of the Prior Art

It is known that when certain materials, referred to as superconductors, are cooled to near absolute zero, they exhibit a complete loss of electrical resistance. Practical utilization of the zero resistance character of superconductive materials has been applied to great advantage in dynamoelectric machinery. For example, in a synchronous generator the use of a superconductive direct current field winding allows a considerable increase in the field magnetomotive force generated by a winding and greatly increased flux densities in the active air gap of the machine. This increase in flux density provides considerably increased power density and substantial reductions in the weight and volume of the machine. Thus, higher ratings for turbine generators can be obtained without prohibitive increases in frame size.

Superconductors which are suitable for such high current density and high field applications are subject to instabilities where a small disturbance in operating conditions can cause a quench. In particular, the superconductive effect will be quenched or lost unless the superconductors are maintained at very low temperatures. Therefore, it is imperative that adequate cooling arrangements be provided. Thus, when a winding or coil is formed of superconductive wires, provision must be made for bringing a coolant or refrigerant into intimate contact with the superconductor. For a dynamoelectric machine having a rotating superconductive field winding, provision must be made for transferring the cooling fluid from a stationary reservoir to the rotating field winding.

The transfer of a cryogen such as liquid helium from a stationary reservoir to the rotating field winding of a dynamoelectric machine has been accomplished in the prior art by a rotating transfer coupling apparatus. A necessary embodiment of the rotating transfer coupling apparatus is a rotating seal which functions to contain the cryogen and prevent the intrusion of air into the rotating member. If air intrudes into the cryogenic space of the rotating member a slush is formed which obstructs the cooling flow passages, thus causing a quench. Rotating seals are normally operated above atmospheric pressure to prevent air intrusion.

The successful development of a rotating field superconducting dynamoelectric machine is dependent upon a reliable cryogen transfer system and proper management of the cryogen conveyed by the rotatable transfer coupling system. Proper cyrogen management includes several considerations: low temperature maintenance; flow balance; flow stability; cooling modes with a field winding; and, transient and quench requirements. In dynamoelectric machines utilizing two-phase cyrogen flow, i.e., a combination of a liquid and vapor, two-phase flow instabilities must be considered for proper helium management. The stability of the coolant flow in a rotating field winding is complicated by the pressurization of the helium coolant caused by the pumping action of the rotor as the coolant moves radially outward from its injection header on the machine axis. The enthalpy rise for this compression, in the adiabatic limit, is given by $$\Delta h = (\omega^2 r^2/2g)$$

where:

$\Delta h$ is the incremental change in enthalpy;
$\omega$ is the angular velocity;
$r$ is the radius of the fluid; and
$g$ is the gravitational constant.

For a 3600 rpm machine with an injection pressure of 1 atmosphere, the critical pressure of 2.26 atmospheres would be reached at a rotor radius of 6 inches. For a rotor field winding radius greater than 6 inches, consideration must be given to the effect of passing the critical pressure of helium. If helium at one atmosphere and 4.2° K is used as a coolant, the effects of the variations in physical properties on flow stability must be considered. These effects can be reduced by cooling the entering helium below 4.2° K to a subcooled liquid state, thus ensuring single phase fluid pressurization that will be more stable than the two-phase process.

One of the major problems associated with two-phase systems is flow instability. Three types of known flow instabilities which are commonly encountered in rotating cryogenic systems are: Ledinegg instabilities in pressure drop oscillations; density wave oscillations; and, thermal acoustic oscillations. All of these instabilities are the result of the coexistence of two distinct phases of different density and transport properties. For further information concerning flow instabilities, see W. B. Bald et al., "Cryogenic Heat Transfer Research at Oxford-Part 2-Flow Boiling," Cyrogenics, pp. 179–197 (April 1974).

One means of reducing the possibility of flow instabilities is to pressurize the coolant above the point at which two phases can coexist, i.e., the critical pressure. For helium the critical pressure is relatively low (2.26 atmosphere) so this is not difficult. By heat exchanging with a helium bath at one atmosphere or less the supply temperature can be kept at 4.2° K or below. However, the vacuum pump and heat exchanger necessary in such a precooling operation are expensive and heavy. Also another disadvantage of supercritical cooling is the fact that the latent heat of vaporization of the helium is no longer available for cooling. All heat absorption must result in a rise in coolant temperature. Therefore, to prevent an excessive rise in coolant temperature, the coolant mass flow must be substantially larger than that for boiling systems. Furthermore, two-phase cryogen flow is desirable for the simultaneous cooling of the field winding, the field winding support structure, the field winding excitation leads, and the radiation and electrical shields, all of which may require a different mass flow rate to maintain its temperature at an optimum value. Thus, it would be desirable to provide a rotatable cryogen transfer system which would simultaneously provide the supercooling of the cyrogen and also accurately control the cryogen liquid-vapor ratio.

Another disadvantage of existing rotating transfer systems is that they tend to compound the Ledinegg instability problem. Since the losses in the rotating transfer system are essentially constant, a flow perturbation which increases flow rate decreases the outlet temperature and hence pressure drop. Thus an increase in flow rate tends to cause a further increase in flow rate. Leading to a possibility of flooding the rotating member in two phase cryogenic systems.

SUMMARY OF THE INVENTION

In general, an adjustable throttle valve is combined with a relatively rotatable cryogen coupling apparatus to provide supercooling of the cryogen through Joule-Thomson throttling without utilizing auxiliary vacuum pumps or heat exchangers, and to provide stable operation for flow perturbations. The invention comprises a relatively rotatable coupling apparatus for conveying fluid from a stationary reservoir to a rotatable member and an adjustable throttle valve operably connected intermediate of the coupling apparatus and the rotatable member for controlling the flow of a cryogenic fluid from the reservoir to the rotatable member. The rotatable coupling cryogen transfer apparatus has an inlet port for providing fluid communication with the reservoir and a discharge port for providing fluid communication with the rotatable member. The adjustable throttle valve has a valve seat disposed intermediate of the rotatable member and the coupling apparatus, and a valve plug disposed intermediate of the valve seat and the rotatable member. Means are provided for displacing the valve plug axially with respect to the valve seat to provide throttling of the cryogen flow. In a preferred embodiment of the invention the rotatable coupling apparatus comprises a first conduit portion connected to the reservoir defining an inlet flow path and a second conduit portion connected to the rotatable member defining a discharge flow path for the cooling fluid, the inlet flow path being in fluid communication with the reservoir and the discharge flow path being in fluid communication with the rotatable member. The first and second conduit portions are interconnected in an overlapping, radially spaced apart relation by rotatable interconnecting means to define a relative motion gap between the overlapping conduit portions and to permit rotational movement of the second conduit portion relative to the first conduit portion. The valve seat of the throttle valve is disposed within the discharge flow path of a second conduit portion and provides a fluid passageway therethrough. The valve plug is also disposed within the discharge flow path of the second conduit portion and has seating surfaces which cooperate with the valve seat to throttle the flow of cooling fluid passing therethrough. The valve plug has a stem portion disposed within and extending axially through the first conduit portion for supporting the valve plug. A valve stem is connected to a piston or other suitable means for causing axial displacement of the valve plug relative to the valve seat. The cryogen flow path is sealed at the interface of the inlet conduit portion and the piston housing by means of a flexible diaphragm.

In operation, a cryogenic fluid such as helium flows through the rotatable coupling apparatus at a substantially constant pressure, for example slightly greater than 1 atmosphere and at increasing enthalpy due to the accumulation of transfer losses between the reservoir and the throttle valve. As the cryogenic fluid passes through the valve it undergoes as isenthalpic expansion with the result that the vapor quality increases and the temperature decreases appreciably below 4.2° K thus providing super-cooling of the cryogenic fluid as it enters the rotating member. Since the throttle valve is disposed downstream of the rotatable transfer apparatus, above atmospheric pressure operation is provided for the rotating seals of the rotating coupling apparatus. Because an increase in mass flow tends to increase quality (i.e., decrease liquid flow) the effect of flow perturbations on flooding is minimized. Inlet throttling also tends to decrease the effects of Ledinegg, density, and acoustic instabilities.

BRIEF DESCRIPTION OF THE DRAWING

The objects and advantages of this invention will become more apparent from consideration of the following detailed description in connection with the accompanying drawing, in which.

DESCRIPTION OF THE PREFERRED EMBODIMENT

Figure 1:
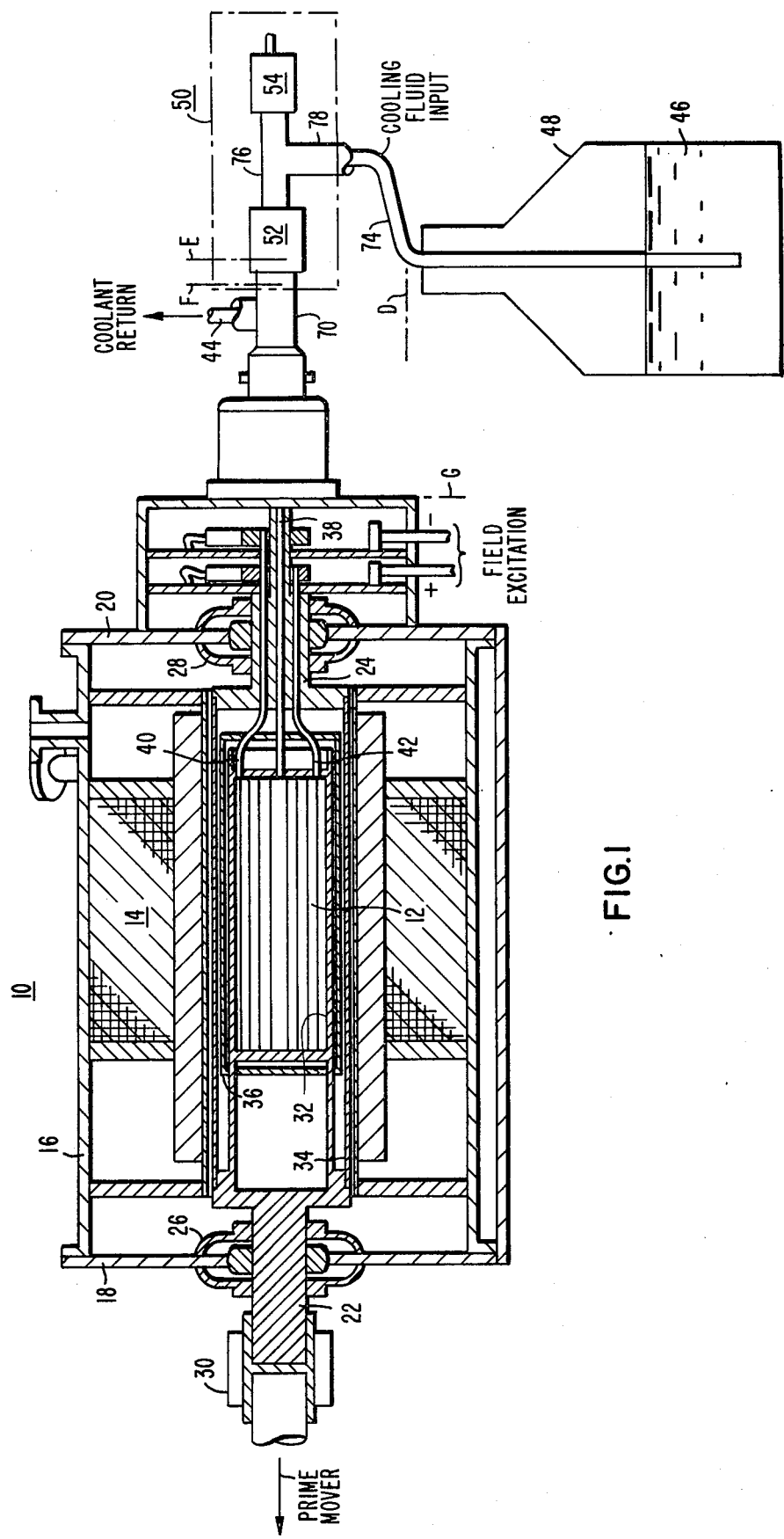
FIG. 1 is an elevation view partly in section of a synchronous dynamoelectric machine having a superconducting rotating field winding through which a cryogenic fluid is circulated according to the teachings of the present invention.

Referring now to the drawing, FIG. 1 illustrates a synchronous generator 10 having a superconductive rotor field winding assembly which is supplied with a cryogenic fluid according to the teachings of the present invention in a manner to be hereinafter described.

The generator 10 comprises a rotor assembly 12 and a stator assembly 14 which are enclosed in a housing 16. The housing 16 is generally cylindrical in shape and is closed by end plates 18 and 20. A drive shaft 22 and a supporting shaft 24 are mounted in the housing by bearings 26 and 28, respectively. The bearings 26 and 28 are conventional and are positioned at each end of the housing to support the shafts 22 and 24 for rotational movement by a prime mover (not shown).

The rotor field assembly 12 comprises a superconductive DC field winding (not shown) which is wound about a non-ferromagnetic core. Also shown is the stator 14 which supports a non-superconductive winding (not shown) which is adapted from multiphase AC output. The rotor field winding is adapted for connection to a DC source (not shown) for the excitation of the generator.

A dewar vessel 32 encloses the field assembly 12 and takes the shape of a cylindrical annulus with a vacuum chamber 34 separating the dewar vessel from ambient conditions. In the vacuum chamber 34 there is located a radiation shield 36 which aids in preventing thermal conduction from the exterior of the dewar vessel to the interior thereof. As a result of the insulation that is created by the vacuum chamber 34 and the radiation shield 36, the interior of the dewar vessel 32 is thermally isolated from the surrounding supporting structure and ambient conditions.

The interior of the dewar vessel 32 is maintained at a temperature near to absolute zero by an appropriate cryogenic fluid, such as nitrogen or helium. Due to the lower boiling temperature of helium (approximately 4° K), it is generally preferred for the cryogenic fluid, although other cryogenic fluids may have equal or better utility in certain situations. The cryogenic fluid is introduced to the interior of the dewar vessel 32 through a conduit 38 which extends through the shaft 24. The conduit 38 is appropriately insulated to minimize heat transfer.

The cooling fluid flows to the axial center of the rotor member 12, and then passes through radial heat exchangers into the field winding. At the axial center of each pole of the field winding, it diverges the flow toward the end turns. A counterflow design is employed so that the exist gas from the field winding cools the drive and non-drive end torque and support tubes, the radiation shield 36, and the electrical leads 40 and 42. After the helium vapor is exhausted over the field conductors 40 and 42, it is passed through a coolant return conduit 44, preferably to a compressor in a closed cycle refrigeration system (not shown).

Liquid helium 46 is conveyed from a reservoir 48 to the rotor member 12 through the rotatable inlet conduit 38 by means of a rotatable coupling apparatus 50 which includes a rotatable cryogen transfer coupling member 52 in combination with an adjustable throttle valve assembly 54.

Figure 2:
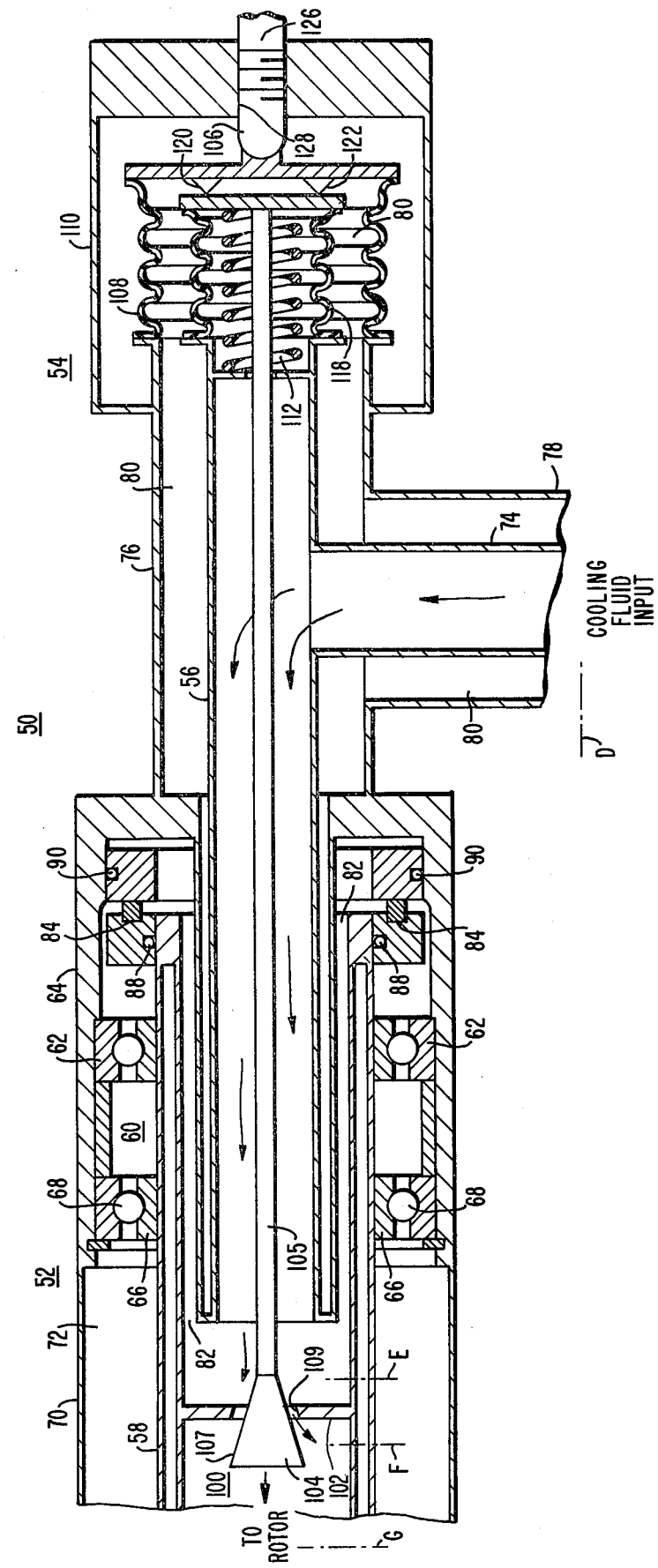
FIG. 2 is a fragmentary sectional view of a rotating coupling member combined with an adjustable throttle valve according to the teachings of the present invention; and, FIG. 3 is a graph which illustrates a set of ideal thermodynamic processes for the flow of a cryogenic fluid from a reservoir through the combined rotating transfer coupling-adjustable throttle valve assembly to the superconducting winding of the dynamoelectric machine of FIG. 1.

Turning now to FIG. 2 of the drawing, the features of the cryogen transfer apparatus 50 are shown in greater detail. The rotatable cryogen transfer coupling member 52 includes a stationary conduit portion 56 and a rotatable conduit portion 58. The conduit portions 56 and 58 are relatively rotatably interconnected by an alignment bearing assembly 60 having an outer race 62 engaged by a housing member 64 and an inner race 66 engaged with the rotatable conduit portion 58. Ball bearings 68 are disposed between the inner race 66 and the outer race 62 in the conventional manner.

The cryogen transfer coupling member 52 includes a conduit 70 which is joined with the housing member 64 and is concentrically spaced about the rotatable conduit member 58 defining an annular chamber between the inner conduit 58 and the outer conduit 70 which constitutes a vacuum chamber 72 for insulating the rotatable conduit 58 from ambient temperatures. The inner conduit member 56 and the main cooling fluid input conduit 74 which connects the cryogen transfer apparatus 50 with the reservoir 48 are similarly vacuum insulated by concentrically disposed conduit members 76 and 78, respectively, to define an insulating volume 80. The chambers 72 and 80 are suitably sealed to sustain a predetermined vacuum.

The stationary inlet conduit 56 is concentrically disposed within the rotatable discharge conduit 58 in an overlapping relationship, the two conduits being spaced apart to define an axially extending annular relative motion gap 82. A rubbing contact face seal 84, located at the inlet end of the coupling 52, forms a gas tight seal which prevents loss of liquid or vapor helium through the relative motion gap 82. The seal 84 also serves to prevent contamination of the machine's containment vessel with air and/or moisture. The seals are preferably constructed from a carbon graphite matrix material containing specific concentrations of self-lubricating materials which are capable of reliable and long-term operation in the dry helium environment.

"0" ring members 88 and 90 cooperate with the rotary face seal member 84 to perfect the rotary seal between the stationary inlet conduit 56 and the rotatable exhaust conduit 58. The sealing apparatus, i.e., the seals 84, 88 and 90, and the alignment bearing assembly 60 are remotely disposed from the main cryogen stream and thus are prevented from contributing any substantial heat load to the supercooled cryogen.

The conduit members 56 and 58 are of double wall construction in the overlapping zone and the volume defined between the double wall portions is evacuated to sustain a predetermined vacuum for further insulation. Furthermore, the walls of the conduit members 56 and 58 are made as small in thickness and as long as possible consistent with vibrational requirements in order to minimize heat conduction along their lengths. The vibrational considerations are important because any substantial radial displacement of the conduit 56 relative to the conduit member 58 may disturb the relatively stagnant column of helium vapor which acts as an insulator against heat transfer and may in extreme cases cause one conduit portion to contact another in mechanical interference thereby generating heat.

In operation the supercooled fluid, e.g., liquid helium at 4.2° K and at slightly greater than atmospheric pressure enters through the conduit member 74 from the reservoir 48 and into the inlet conduit member 56. From there it passes through the rotatable conduit member 58 where it is conveyed through the conduit 38 to the rotor member 12 of the dynamoelectric machine 10 where it may be utilized for cooling the superconductor winding of the rotor member 12.

In accordance with the teachings of the present invention, a throttle valve assembly 100, which is adjustable while the cryogen transfer assembly 50 is on line and in rotatable operation, is operably disposed downstream from the rotating seal members 84 and 88 and thus maintains an above atmospheric pressure upon the seals. The throttle valve 100 comprises a valve seat 102, a valve plug 104, and a valve stem 105 which is connected to the valve plug and extends through the overlapping conduit members 58 and 56 to axial displacing means of the adjustable throttle valve assembly 54 where it is connected to transmit axial displacing movements to the valve plug 104.

While any suitable means may be used to cause axial displacement of the valve plug 104, a piston 106 and a dual cylinder bellows seal 108 are shown cooperatively engaged within a housing member 110 to provide adjustment of the position of the valve plug 104 relative to the valve seat 102 during dynamic operation of the cryogen coupling apparatus 50. A spring member 112 is shown in compressive engagement between the stationary inlet conduit 56 and the piston 106 and coaxially disposed within the bellows seal 108 to provide a reaction force against the piston 106 to maintain equilibrium as the piston 106 is translated axially within the housing 110. The cylindrical bellows seal 108 is welded or otherwise suitably joined to the conduit 56 and conduit 76 to define an annular chamber 118. This chamber, in combination with the space surrounding the valve stem 105, becomes filled with relatively stagnant cooling fluid as the cooling fluid 46 passes through the conduit 56. The chamber 118 is maintained as small and narrow as possible within the limitations of mechanical alignment in order to minimize centrifugal convection currents within the bore which adversely affect the insulating temperature gradient capability of the relatively stagnant vapor column. A plurality of thin support members 120, 122 link the bellows 108 to the piston 106. The piston and the housing may be modified with cooperating screw thread advance portions 126 and 128 for manual adjustment of the throttle valve 100.

The valve plug 104 has an annular seating surface 107 which cooperates with an annular seating surface 109 of the valve seat 102 to throttle the flow of the cooling fluid 46 as it passes from the inlet conduit 56 into the rotatable discharge conduit 58. (While a valve seat and valve plug have been generally illustrated, it should be apparent that other valve configurations such as the "reed" and "butterfly" may be used to good advantage.) Thus the throttle valve 100 is adjustable during operation of the dynamoelectric machine to accurately control the cryogen vapor to liquid ratio. Because the throttling is performed downstream with respect to the seals 84 and 78, greater than atmospheric pressure is maintained on the seals and thereby prevents contamination from the surrounding atmosphere.

Figure 3:
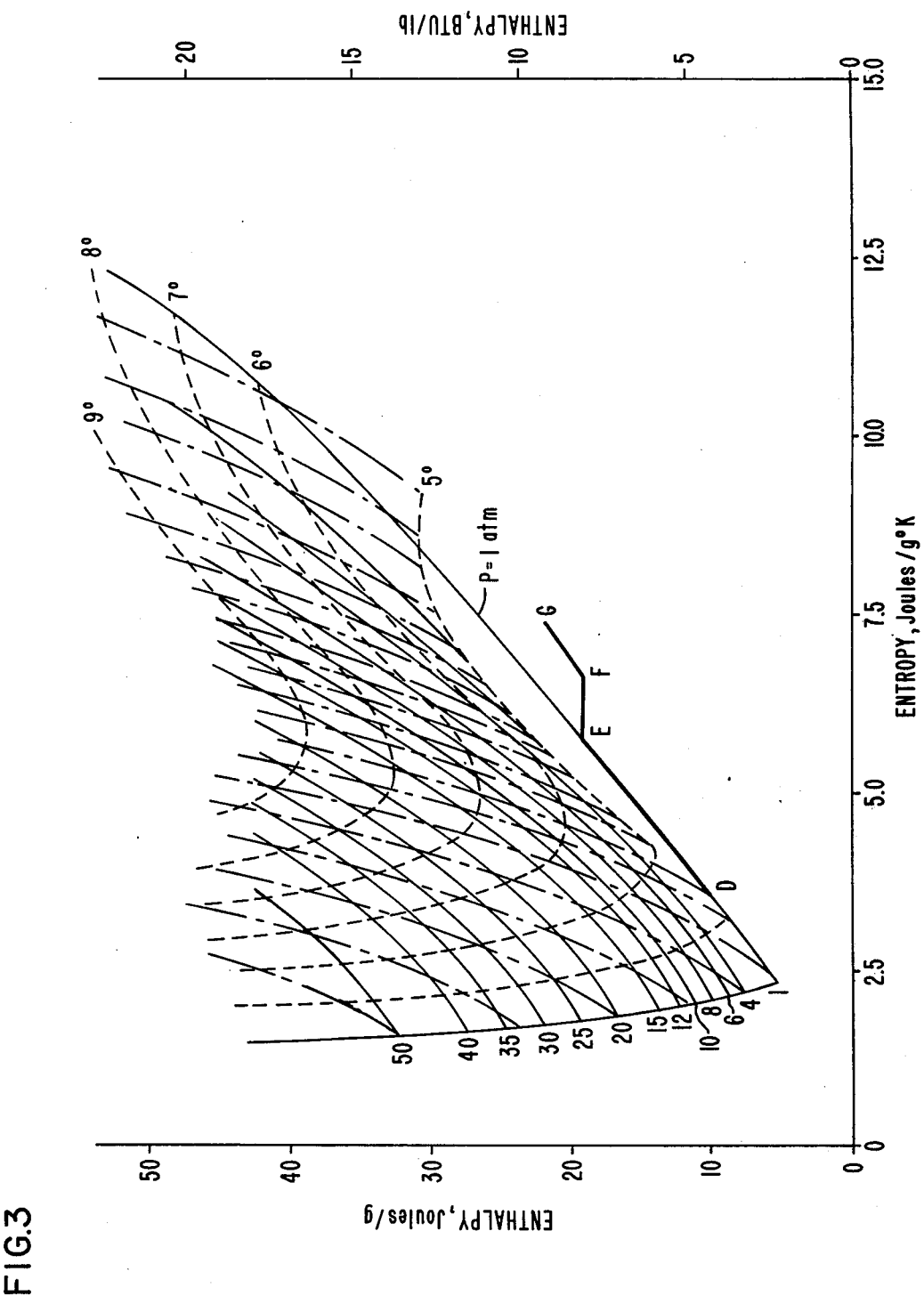

Referring to FIGS. 1 and 3, it is seen that there is a constant pressure enthalpy rise from the points D to E on the curve which represents a pressure of slightly greater than one atmosphere, which is associated with the accumulation of transfer system losses between the reservoir 48 and the valve 100. However, the liquid helium undergoes an isenthalpic expansion through the valve which is represented by the path marked at points E and F on the curves so that the liquid helium entering the machine inlet conduit 38 is supercooled to some point below its nominal 4.2° K temperature. The path F to G represents the absorption of heat losses along the length of the rotating conduit member 58 from the coupling apparatus until it is discharged into the superconducting winding 12.

Thus the liquid helium is supercooled below 4.2° K without vacuum pumps or heat exchangers. Above atmospheric pressure operation is provided for the rotating seals 84 and 88 to prevent contamination of the cryogen flow stream. Since an increase in mass flow through valve 100 tends to increase quality, that is, decrease liquid flow, the effect of flow perturbations is minimized and the system tends to be more stable. Also, the ideal head for a given operating condition is directly proportional to the density of the cryogen entering the rotor of the machine. Thus the present invention also provides convenient means for dynamic adjustment of the proper ratio of vapor to fluid for ideal head by a two-phase pressure drop immediately upstream of the super-conducting rotor member.

What is claimed is:

1. In a dynamoelectric machine having a rotor member disposed upon a shaft for rotation within an annular stator member, said shaft having a passage for permitting the flow of a cooling fluid therethrough to said rotor member, coupling means secured to said shaft for transferring said cooling fluid from a reservoir to said shaft passage, said coupling means having a first conduit portion connected to the reservoir defining an inlet flow path and a second conduit portion connected to said shaft defining a discharge flow path for said cooling fluid, the inlet flow path being in fluid communication with the reservoir and the discharge flow path being in fluid communication with said shaft passage, said first and second conduit portions being interconnected in an overlapping, radially spaced apart relation by rotatable interconnecting means to define a relative motion gap between the overlapping conduit portions and to permit rotational movement of said second conduit portion relative to said first conduit portion, the combination with said coupling means of an adjustable throttle valve for regulating the flow of cooling fluid passing therethrough, said throttle valve comprising a valve seat disposed within the discharge flow path of said second conduit portion and providing a fluid passageway therethrough, a valve plug disposed within said discharge flow path of said second conduit portion having seating surfaces which cooperate with said valve seat to throttle the flow of cooling fluid therethrough, said valve plug having a stem portion disposed within and extending axially through said first conduit portion for supporting said valve plug, means connected to said stem for axially displacing said stem and valve plug relative to said valve seat, and means for fluidly sealing said relative motion gap from the atmosphere.

2. The combination as defined in claim 1, wherein said means for axially displacing said valve plug includes a piston and a housing member, said housing member having portions defining a bore, said piston being disposed for axial displacement with respect to said housing within said bore, said valve stem extending through said bore and being mechanically linked with said piston, a cylindrical bellows disposed within said bore having a first end portion connected to said first conduit portion and having a second end portion connected to said piston and being concentrically disposed about said valve stem, the combination of said bellows and said piston forming a seal to prevent the escape of said cooling fluid from said first conduit portion, said bellows having resilient portions which contract and expand as said piston is displaced axially within said bore.

* * * * *